United States Patent [19]

Urban

[11] 3,728,439

[45] Apr. 17, 1973

[54] TREATMENT OF A SULFITE CONTAINING AQUEOUS STEAM TO SELECTIVELY PRODUCE ELEMENTAL SULFUR

[75] Inventor: Peter Urban, Northbrook, Ill.

[73] Assignee: Universal Oil Products Company, Des Plaines, Ill.

[22] Filed: Nov. 5, 1970

[21] Appl. No.: 87,393

[52] U.S. Cl. ..................... 423/567, 210/50, 423/571
[51] Int. Cl. ............................................. C01b 17/02
[58] Field of Search ................. 23/224, 229; 210/50, 210/63

[56] References Cited

UNITED STATES PATENTS

| | | | |
|---|---|---|---|
| 1,636,106 | 7/1927 | Naef | 23/137 |
| 3,536,618 | 10/1970 | Urban et al. | 23/224 X |
| 1,062,120 | 5/1913 | Sanborn | 23/225 |

FOREIGN PATENTS OR APPLICATIONS

| | | | |
|---|---|---|---|
| 947,640 | 1/1964 | Great Britain | 23/225 |

OTHER PUBLICATIONS

Mellor; "Comprehensive Treatise on Inorganic and Theoretical Chem.," Longmans Green & Co., N.Y. 1930, Vol. X, pp. 516–518.

Primary Examiner—Oscar R. Vertiz
Assistant Examiner—George O. Peters
Attorney—James R. Hoatson, Jr. and Thomas K. McBride

[57] ABSTRACT

An input water stream containing a water-soluble sulfite compound is treated to produce elemental sulfur, while minimizing the formation of undesired sulfate by-products by the steps of: (a) selectively converting the sulfite compound to the corresponding thiosulfate compound; (b) reacting a portion of the resulting thiosulfate-containing stream with a reducing agent to form a sulfide-containing stream; (c) reacting the remaining portion of the thiosulfate-containing stream with the sulfide-containing stream to form the corresponding polysulfide compound; and thereafter, subjecting the resulting stream containing the polysulfide compound to decomposition conditions selected to form elemental sulfur, hydrogen sulfide, and a substantially sulfate-free treated water stream. The principal utility of this treatment procedure is associated with the clean up, or regeneration, of sulfite-containing aqueous streams such as are produced by contacting $SO_2$-containing flue gas with a suitable aqueous absorbent stream. Key features of this process are the selective conversion of the sulfite compound to the corresponding thiosulfate compound, the subsequent reduction of a portion of this thiosulfate compound to the corresponding sulfide compound and the use of this sulfide compound to selectively reduce the remaining portion of the thiosulfate compound to elemental sulfur.

20 Claims, 1 Drawing Figure

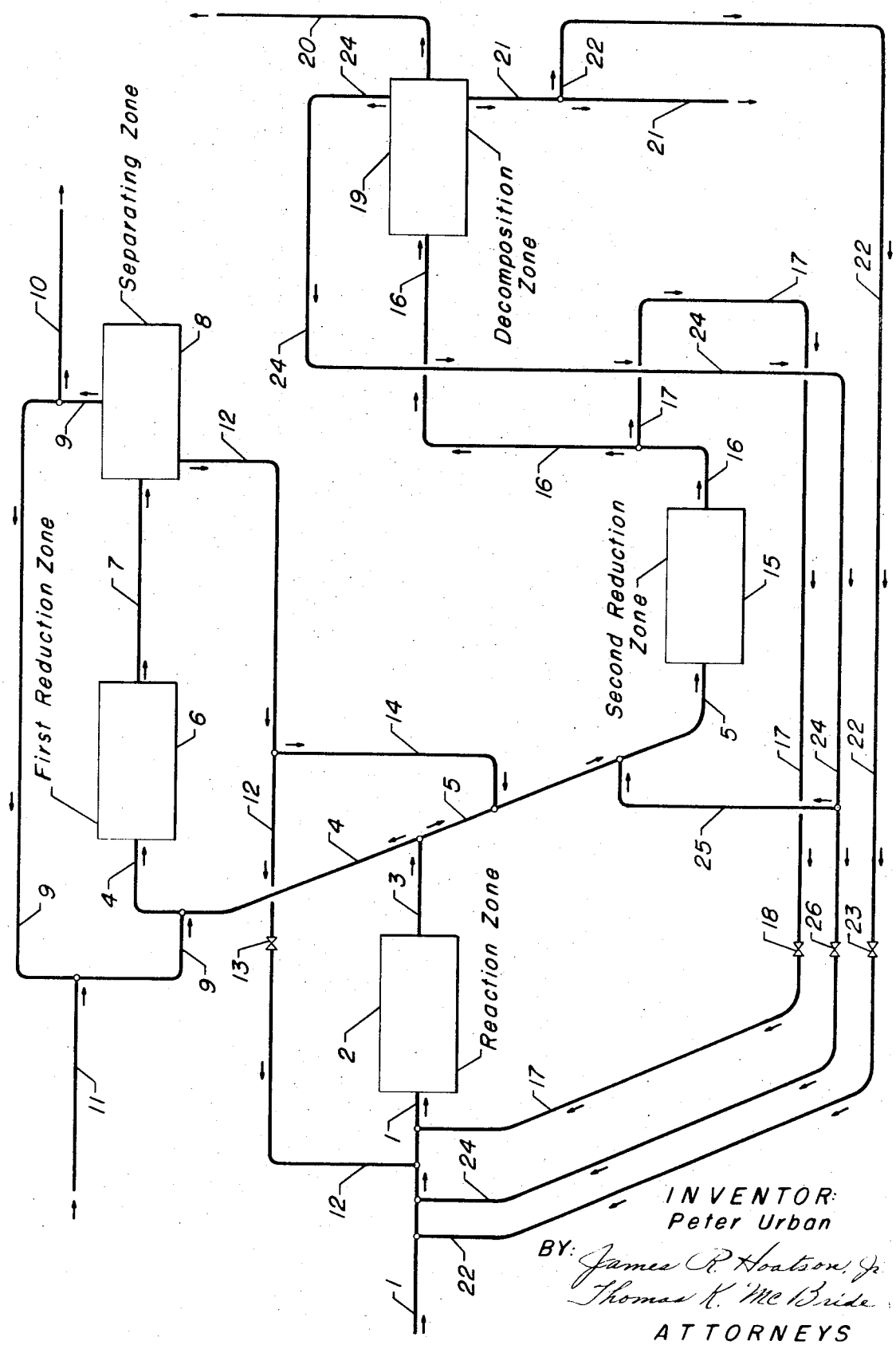

TREATMENT OF A SULFITE CONTAINING AQUEOUS STEAM TO SELECTIVELY PRODUCE ELEMENTAL SULFUR

The subject of the present invention is a multi-step process for the selective treatment of an aqueous stream containing a water-soluble sulfite compound for the purpose of converting the sulfite compound to elemental sulfur in a highly selective manner. Another purpose for the treatment procedure is to lower the total sulfur content (i.e., total amount of sulfur contained in the aqueous stream in any form, calculated on an elemental basis) of the aqueous input stream to the point where it can be safely discharged into a suitable sewer without causing a major pollution problem, or alternatively, reused in the process or industrial activity which originally produced it. More precisely, the present invention involves a novel four step process for treating an aqueous stream containing a water-soluble sulfite compound in which the sulfite compound is first selectively reduced to the corresponding thiosulfate compound, a portion of this thiosulfate compound is then selectively reduced to the corresponding sulfide compound and the resulting sulfide compound is then used to selectively reduce the remaining portion of the thiosulfate compound to form the corresponding polysulfide compound. Elemental sulfur is then easily recovered from the polysulfide compound via a conventional decomposition technique. In a narrower aspect, the current invention involves a procedure for the treatment of an aqueous input stream containing ammonium sulfite and/or ammonium bisulfite to selectively produce elemental sulfur and a treated aqueous output stream which has greatly reduced total sulfur content relative to the input stream. In another limited aspect, the present invention relates to the treatment of an aqueous input stream, which is produced by scrubbing a gas stream containing $SO_2$ with an aqueous absorbent solution containing a suitable alkaline reagent, in order to regenerate the rich solution while simultaneously converting the absorbed sulfite compound to elemental sulfur and minimizing the amount of undesired, intractable sulfate by-products formed.

A major problem encountered in areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc. to produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a wood-pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity.

Many processes have been proposed for removal of sulfur dioxide from these gas streams. A large percentage of these proposed removal procedures involve contacting the sulfur dioxide-containing gas stream with an aqueous absorbent stream which typically contain materials which chemically or physically react with the sulfur dioxide in order to absorb same into the liquid solution. A common procedure involves the use of a solution of an alkaline reagent such as ammonium hydroxide, sodium hydroxide, sodium carbonate, ammonium carbonate and the like alkaline reagents, to produce a rich absorbent stream containing the corresponding sulfite compound. Likewise, similar aqueous solution containing salts of sulfurous acid are produced in many areas of modern industry such as in the chemical, petrochemical, pharmaceutical steel, paper, food, fertilizer, petroleum and the like industries.

Because these water streams contain sulfite compounds, their discharge into a waste water sewer can cause substantial, well-known water pollution problems including excessive biological oxygen demand, poisoning of marine and plant life and the like. Regardless of the source of these aqueous, sulfite-containing streams, it is clear that there is a substantial need for a simple and effective method for treating them in order to allow their reuse in the processes which produced them or their safe discharge into a suitable sewer. In addition, it is most advantageous to recover the sulfur contained in these streams in the form of elemental sulfur because of the substantial market therefore. In the case where the treated water stream is to be recycled to the process which produced the input water stream, it is generally required that the treated water stream be substantially free of sulfate compound. The reason for this requirement is that these compounds, once formed, are very intractable and in a closed system tend to build up in the recycle water stream until finely divided solids are formed. These solids then can precipitate in the form of a scale or sludge which can foul the internals of the equipment using this recycle stream. For instance, when the treated stream is recycled to a gas scrubbing process, these sulfate compounds can cause severe corrosion and erosion difficulties in the scrubbing equipment, plus they can foul the internals of the scrubbing means. When a drag stream is withdrawn from the process and discarded or treated by a method such as crystallization, evaporation or filtration, to remove these sulfate compounds, valuable alkaline reagent is typically lost from the system. Moreover, the yield of sulfur recovered during the water treatment operation is detrimentally affected by these sulfate by-products.

One solution that has been proposed to the problem of treating these sulfite-containing water streams is the use of a suitable reducing agent to react with the sulfite compounds contained therein to make elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation-reduction at the conditions necessary for direct reduction.

The problems addressed by the present invention is, therefore, to provide a procedure for treating these sulfite-containing aqueous streams to recover elemental sulfur thereform, to produce a treated aqueous stream of greatly reduced total sulfur content and to minimize the amount of undesired sulfate by-products.

I have now found a method for treating an input water stream containing a water-soluble sulfite compound which enables the recovery of elemental sulfur in high yields, minimizes the formation of sulfate by-products, and produces a treated water stream which is of relatively low total sulfur content and is suitable for recycle to the process which produced the original input water stream. The concept of the present invention is based on my finding that the sulfite compound contained in this input water stream can be easily converted at relatively low severity conditions to the corresponding thiosulfate compound in a highly selective manner without forming any substantial amounts of undesired intractable sulfate compounds. Coupled with this finding is my additional finding that this thiosulfate compound can be conveniently and selectively reduced to elemental sulfur by a procedure wherein a portion of the thiosulfate compound is reduced to the corresponding sulfide compound, and the resulting sulfide compound is then reacted with the remaining protion of the thiosulfate compound to selectively form the corresponding polysulfide compound from which elemental sulfur can be easily recovered. More precisely, the concept of the present process involves: converting the sulfite compound to the corresponding thiosulfate compound, reducing of a portion of this thiosulfate compound in order to form the corresponding sulfide compound, then using the resulting sulfide compound to react with the remaining portion of the thiosulfate compound to produce the corresponding polysulfide compound and thereafter, decomposing the polysulfide compound to recover sulfur. The principal advantages associated with this route for the production of elemental sulfur are: (1) Sulfur is selectively produced and undesired sulfate by-products are minimized. (2) An outside source of $H_2S$ is not required. (3) Relatively economical reducing agents can be utilized to supply the necessary reduction power for the over-all process. (4) Control problems are minimized because the basic reactions are simple, fast and highly selective. (5) The reducing agent used in the preliminary treatment step to convert sulfite to thiosulfate is available from a number of alternative internal sources (6) All steps in the instant process can be non-catalytic if desired. (7) All steps are run under liquid phase conditions so that utility requirements are minimized. (8) The sulfur recovered is of a high quality and can be used to make high quality sulfuric acid or any of the other well known products that are commonly made from elemental sulfur.

In summary the central point of the present process involves using thiosulfate as an intermediate in a multi-step process to selectively produce elemental sulfur rather than attempt to directly reduce the sulfite compound to elemental sulfur in a one step operation. In addition, advantage is taken of the fact that thiosulfate can be easily and selectively reduced to sulfide while attempts at direct reduction of thiosulfate to sulfur with economical reducing agents such as hydrogen and carbon monoxide typically result in very poor yields of elemental sulfur. However, once the sulfide is formed from a portion of the thiosulfate, it provides a selective reducing agent which can react with the remaining portion of the thiosulfate to produce sulfur via a polysulfide intermediate in a highly selective manner.

It is, accordingly, one object of the present invention to provide a simple, effective and selective method for treating a sulfite-containing input water stream to produce elemental sulfur and a treated water stream of greatly reduced total sulfur content. Another object is to minimize the amount of undesired intractable sulfate by-products formed during the treatment procedure. Yet another object is to allow the use of relatively economical reducing agents such as carbon monoxide and/or hydrogen in the treatment procedure and yet still enable the selective production of elemental sulfur. Still another object is to provide a treatment procedure for this type of input stream where the route to elemental sulfur is through a thiosulfate intermediate. Another object is to provide a treatment procedure of the kind described wherein advantage is taken of the inherent capability of carbon monoxide and/or hydrogen to selectively reduce a water-soluble thiosulate compound to the corresponding sulfide compound and of the capability of sulfide to selectively reduce thiosulfate to sulfur via a polysulfide intermediate.

In brief summary, the present invention, is in one embodiment, a process for treating an input water stream containing a water-soluble sulfite compound in order to produce elemental sulfur and a treated aqueous output water stream, which has a relatively low total sulfur content, while minimizing sulfate by-products. In the first step of the process, the input water stream is contacted with a reducing agent, selected from the group consisting of finely divided sulfur, a polysulfide compound, a water-soluble sulfide compound and mixtures thereof, at reaction conditions selected to form a thiosulfate-containing effluent stream. Thereafter, in the second step, a first portion of the effluent stream from this first step is reacted with a reducing agent selected from the group, consisting of carbon monoxide, hydrogen and mixtures thereof, at reduction conditions selected to result in a sulfide-containing effluent stream. In the next step, a second portion of the effluent stream from the first step is reacted with at least a portion of the effluent stream from the second step at reduction conditions selected to result in an effluent stream containing a polysulfide compound. At least a portion of this polysulfide-containing effluent stream is then, in the final step, decomposed to form elemental sulfur, hydrogen sulfide and a treated aqueous stream.

In a second embodiment, the present invention is a process as described in the first embodiment wherein the second step is performed in the presence of a catalyst comprising a combination of a metallic component, selected from the group consisting of transition metals of groups VI and VIII of the Periodic Table and compounds thereof, with a porous carrier material.

In another embodiment, the present invention is a process as described above in the first embodiment wherein the input water stream contains ammonium sulfite and/or ammonium bisulfite; the reducing agent utilized in the first step is selected from the group consisting of finely divided elemental sulfur, hydrogen sulfide, ammonium hydrosulfide, ammonium polysulfide and mixtures thereof; the effluent stream from the second step contains ammonium hydrosulfide; and the effluent stream from the third step contains ammonium polysulfide.

Still other embodiments of the present process relate to internal sources for the reducing agent utilized in the first step of the process described in the first embodiment. One source is a portion of the hydrogen sulfide produced in the polysulfide decomposition step. Another source is a portion of the elemental sulfur recovered in the polysulfide decomposition step. Yet another source is a portion of the polysulfide-containing effluent stream produced in the third step. Still another source is a portion of the sulfide-containing effluent stream produced in the second step. Occasionally a mixture of two or more of these streams may be utilized as the reducing agent in the first step.

Other objects and embodiments of the present invention are hereinafter disclosed in the following discussion of the input streams, output streams, preferred conditions, preferred reactants, catalysts and mechanics associated with each of the essential and preferred steps of the present invention.

As indicated above, the first step of the present process, the preliminary treatment step, involves the conversion in a highly selective manner, of the sulfite compound contained in the input water stream to the corresponding thiosulfate compound. The sulfite compound contained in this input water stream is generally characterized as water-soluble. Examples of water-soluble sulfite compounds are sulfite salts of relatively strong bases such as ammonium sulfite, the alkali metal sulfites and the alkaline earth sulfites. In addition to the normal sulfite salts, it is intended to include the bisulfite salts of the relatively stronger bases. Especially suitable alkali metal sulfite compounds are sodium sulfite and potassium sulfite. Likewise, suitable alkaline earth sulfites are exemplified by magnesium sulfite. The preferred sulfite compounds for purposes of the present invention are ammonium sulfite and sodium sulfite. Ordinarily, the sulfite compound will be present in this input aqueous solution in an amount ranging from about 0.01 wt. percent up to the solubility limit of the particular sulfite compound in water at the conditions utilized in this first step. Particularly good results are obtained when the aqueous stream contains about 1 to about 30 wt. percent of the sulfite compound. It is to be noted that in many cases the aqueous input stream to this step will contain a mixture of a normal sulfite salt and a bisulfite salt such as a mixture of $(NH_4)_2SO_3$ and $NH_4HSO_3$ or a mixture of $(Na)_2SO_3$ and $NaHSO_3$.

The reducing agent utilized in this first step is selected from the group consisting of finely divided sulfur, a polysulfide compound, a water-soluble sulfide compound and mixtures thereof. In a first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although any other suitable means for injecting finely divided solid particles can be utilized if desired. One preferred source for the sulfur reactant in this mode of operation is a portion of the product sulfur from the subsequently described polysulfide decomposition step. In this first mode of operation, it is preferred to also utilize a wetting agent in the reaction mixture in order to facilitate good contact of the elemental sulfur with the sulfite compound. Suitable wetting agents are: the salts of the alkyl aryl sulfonates such as the sodium salt of dodecylbenezene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the first step should be sufficient to supply one atom of sulfur per molecule of sulfite compound contained in the input aqueous stream with the preferred amount corresponding to about 1 to about 3 atoms of sulfur per mole of sulfite compound.

In a second mode of operation for this first step, the reducing agent is a polysulfide compound. Suitable polysulfide compounds include the ammonium, alkali metal, and alkaline earth polysulfides. Best results are ordinarily obtained with ammonium polysulfide. The polysulfide compound is ordinarily charged to this first step in the form of an aqueous solution containing about 1 to about 50 wt. percent of the polysulfide compound. One particularly preferred source for this solution is a portion of the effluent stream from the hereinafter described third step, the principal reduction step, of the instant process. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfide compound contains four atoms of elemental sulfur and one atom of sulfide (e.g., $(NH_4)_2S_5$), the stoichiometric amount is 1/6 moles of polysulfide per mole of sulfite compound, with a preferred value being about ¼ to about ¾ or more moles of polysulfide per mole of sulfite compound.

In a third mode of operation of this preliminary treatment step, the reducing agent is a water-soluble sulfide compound. Suitable water-soluble sulfide compounds are hydrogen sulfide, ammonium sulfide, ammonium hydrosulfide and the sulfides and hydrosulfides salts of the alkali and alkaline earth metals. Best results are ordinarily obtained in this mode of operation of this step when the sulfide reactant is hydrogen sulfide or sodium hydrosulfide, or ammonium hydrosulfide. The amount of this sulfide reactant utilized in this step is at least sufficient to provide 0.5 moles of sulfide compound per mole of sulfite compound contained in the input water stream, with best results obtained at a mole ratio corresponding to about 0.6 to about 1.5 or more. Preferred sources for the sulfide reactant in this mode are: a portion of the $H_2S$ product of the polysulfide decomposition step, a portion of the effluent stream from the second step, or a combination of these.

Conditions utilized in this first step are generally described as thiosulfate production conditions. These conditions are relatively mild and include: a relatively low temperature of about 20° to about 150° C., with a preferred temperature of about 50° to about 100° C.; a pressure sufficient to maintain the input water stream in the liquid phase during the first step, with a pressure of about 1 to about 30 atmospheres generally being satisfactory; and a relatively short contact time corresponding to about 0.01 to about 0.5 hrs., with a preferred contact time being about 0.01 to about 0.25 hrs. In general the contact time necessary for the desired thiosulfate formation reaction is a function of the reducing agent and specific conditions utilized. In all cases within the stated ranges of conditions and for the reducing agents specified, the reaction is extremely rapid with excellent results typically obtained in one to five minutes. The pH of the water stream charged to this first step should be at a level of at least 5.5 with the preferred range being about 7 to about 10 or more. Considering all of the factors involved in the operation of this first step, best results are ordinarily obtained at a temperature of about 65° C. when the reducing agent is a sulfide compound or a polysulfide compound. In particular, ammonium polysulfide or ammonium hydrosulfide yields excellent results.

Following this preliminary treatment step, an aqueous effluent stream containing relatively large amounts of the corresponding thiosulfate compound is withdrawn therefrom. For example, when the input water streams contain ammonium sulfite and bisulfite, the corresponding thiosulfate compound is ammonium thiosulfate. Typically the selectivity for thiosulfate achieved in this first step is within the range of about 70 to about 95 percent or more of the input sulfite compound converted to the corresponding thiosulfate compound, with only a trace amount of undesired sulfate by-products formed. An essential feature of the present invention is the reaction of separate portions of the thiosulfate component of this effluent stream from this first step in the next two steps of the instant process. The mechanics concerned with how these separate portions are reacted in the separate steps is subject to some choice. One mode of operation involves operating the second step with a stoichiometrically insufficient amount of reducing agent relative to the amount of thiosulfate contained in the effluent stream from the first step so that not all of the thiosulfate reacts in the second step. In this mode of operation, both portions of the thiosulfate-containing effluent stream are passed to the second step with only one portion being reacted therein. An alternative mode of operation is shown in the attached drawing wherein the effluent stream from the first step is physically separated into two separate portions, the first portion passed to the second step and the second portion being passed directly to the hereinafter described third step. This last mode of operation is preferred primarily because it greatly simplifies problems of control of the amount of sulfide formed in the second step. Regardless of these mechanical considerations, the amount of this effluent stream passed to, or reacted in the second step should be approximately one-half to about three-fourths of the total effluent stream from the first step, with the remaining portion being passed to the hereinafter described third step, the polysulfide formation step. It is, of course, understood that during start-up of the process, all or greater portions of the effluent stream may be passed to the second step in order to build up a suitable inventory of sulfide reactant for the third step. A preferred mode of operation involves passing two-thirds of the thiosulfate-containing effluent stream to the second step. In short, the split of the thiosulfate reactant between the second and third step in the preferred case should be in the proportions 2:1.

In the second step of the present process, the primary reduction step, the first portion of the effluent stream from the first step is reacted with a reducing agent selected from the group consisting of carbon monoxide, hydrogen and mixtures thereof at reduction conditions selected to produce a sulfide-containing effluent stream. The reducing agent for use in this primary reduction step may be obtained from any suitable source or may be prepared in any suitable manner. In the case where this reducing agent essentially comprises a hydrogen stream, it may be substantially pure hydrogen or a mixture of hydrogen with other relatively inert gases such as a mixture of hydrogen with lower molecular weight hydrocarbons, a mixture of hydrogen and nitrogen, a mixture of hydrogen and steam, a mixture of carbon dioxide and the like gaseous streams. One acceptable source of a hydrogen steam is obtained by catalytic steam reforming of hydrocarbons coupled with CO shift conversion to $H_2$. Another source is the excess recycle gases obtained from various petroleum processes which have a net hydrogen make such as a reforming process, a dehydrogenation process and the like. Still another source is hydrogen obtained by electrolysis. In the case where the reducing agent is carbon monoxide, it can be obtained from any suitable source or may be prepared in any suitable manner. An acceptable carbon monoxide stream is obtained by the partial oxidation of organic materials, and particularly carbon and hydrocarbons at high temperatures with oxygen, air or steam. Likewise, a carbon monoxide stream suitable for use herein can be prepared by the reduction of carbon dioxide by hydrogen, carbon or certain metals at high temperatures. For example, a gas stream containing about 40 percent carbon monoxide is easily prepared by blowing steam through a bed of coal at an elevated temperature. Another suitable carbon monoxide-containing stream is obtained by simultaneously blowing air and steam through a bed of red hot coal to produce a gas stream containing about 30 percent carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $CO_2$ to CO. Regardless of the source of the reducing agent, it is preferably used herein in an amount sufficient to provide a mole ratio of reducing agent (i.e., CO or $H_2$) to thiosulfate compound of at least 4:1, with best results obtained at a mole ratio of about 4:1 to 20:1 or more. I have observed that the amount of sulfide formed increases with higher mole ratios of reducing agent to thiosulfate.

This second step can be carried out, if desired, without the use of a catalyst in the case where the reducing agent is carbon monoxide; however, in many cases it is advantageous to use a catalyst for this reaction. Based on my investigations I have determined that improved results are obtained in this second step when the reaction zone contains materials such as particles of charcoal and particles of activated carbon. Particularly good results are obtained with a catalyst comprising a metallic component selected from the group consisting of the transition metals of groups VI and VIII of the Periodic Table and compounds thereof, such as chromium, molybdenum, tungsten, iron, cobalt, nickel, platinum, palladium, etc. From this, I have concluded that preferred catalysts for the desired reduction reaction comprise a combination of a group VI or a group VIII transition metal component with a suitable porous support such as alumina or activated carbon. Particularly preferred embodiments of the present method involve the use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade names of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. percent of cobalt sulfide. In general, the amount of the metallic component utilized in the catalyst should be sufficient to comprise about 0.1 to about 50 percent thereof, calculated on an elemental basis. These catalysts can be prepared according to any of the conventional procedures for combining a metallic component with a carrier material, with an impregnation procedure with a soluble, decomposable compound of the desired group VI or VIII metal ordinarily giving best results.

This primary reduction step can be carried out in a conventional reaction zone in any suitable manner. The first portion of the thiosulfate-containing effluent stream from the first step can be passed into the reaction zone in either upward, radial or downward flow and the reducing gas stream can be simultaneously introduced into the reaction zone in either countercurrent or concurrent flow relative to the thiosulfate-containing effluent stream. In particular, a preferred embodiment of this second step involves downward flow of the thiosulfate stream with concurrent flow of the reducing gas stream. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this second step, best results are ordinarily obtained when the catalyst is maintained within the reaction zone as fixed bed of relatively small particles. These catalyst particles perform the dual functions of catalyzing the desired reaction and of promoting intimate contact between the gas and liquid streams. In the preferred concurrent flow mode of operation for this step, an effluent stream containing unreacted reducing agents, some hydrogen sulfide, and an aqueous stream containing the corresponding sulfide compound is withdrawn from the reaction zone. In the case where CO is the reducing agent, this stream will also contain $CO_2$ and carbonate salts.

The reduction conditions utilized in this primary reduction step are typically relatively more severe than those utilized in the first step and can be generally characterized as reduction conditions sufficient to effect conversion of thiosulfate to sulfide. The temperature is preferably selected from the range of about 125° to about 350° C., with best results obtained at a relatively high temperature of about 175° to about 350° C. It is an essential feature of the present invention, that the second step be conducted under liquid phase conditions; accordingly, the pressure employed must be sufficient to maintain at least a portion of the effluent stream from the first step in the liquid phase. Typically the pressure is selected from the range of about 100 to about 3,000 psig., as a function of the reaction temperature in order to maintain the desired liquid phase condition. Particularly good results are obtained at a temperature of about 200° C., and a pressure of about 500 psig. It is preferred to use a liquid hourly space velocity (defined on the basis of the liquid volume charge rate of the effluent stream from the first step divided by the volume of the reaction zone utilized in this second step in the case where a catalyst is not utilized and by the volume of the catalyst bed in the case where a catalyst is used in this second step) selected from the range of about 0.25 to about 10 hrs.$^{-1}$, with best results obtained at about 0.5 to about 3 hrs.$^{-1}$. Excellent results have been obtained in this second step with a LHSV of 1 hrs.$^{-1}$.

The effluent stream from this primary reduction step will contain substantial amounts of the sulfide compound corresponding to the alkaline reagent present in the input water stream; for example, in the case where the alkaline reagent is ammonium hydroxide or carbonate, the sulfide component will be ammonium hydrosulfide, and in the case where the alkaline reagent is sodium hydroxide and carbonate the corresponding sulfide component will be sodium sulfide or hydrosulfide. In addition, this effluent stream will contain small amounts of unreacted thiosulfate and trace amounts of undesired sulfate compounds. It is a feature of the present invention that the amount of these undesired sulfate compounds formed during this second step will be held to extremely small levels--typically substantially less than 5 wt. percent of the thiosulfate sulfur charged to this second step. In addition, this effluent stream from the second step can contain substantial quantities of unreacted reducing gas when this second step is operated with an amount of reducing gas which is greater than the stoichiometric amount required to reduce the thiosulfate compound charged thereto. In the case where this second step is operated so that all of the reducing gas charged thereto is reacted therein, it is usually not necessary to separate unreacted reducing gas from this effluent stream, and the entire stream can be directly charged to the third step of the present process. Since it is ordinarily preferred to operate this second step with a substantial excess of reducing gas, the normal mode of operation of the present process will require the separation of unreacted reducing gas from the effluent stream withdrawn from the second step. This separation step can easily be performed in any suitable gas-liquid separation zone which should be maintained at approximately the same temperature as is used in the reaction zone of the second step. The separation zone is operated to effect a phase separation between the liquid and gaseous components of the effluent stream. In the main, the gaseous phase will typically comprise unreacted reducing gas, carbon dioxide, and water vapor. It is withdrawn from this zone and recycled via a suitable compressing means to the second step of the present invention. The liquid stream from this separation zone will contain the corresponding sulfide compound, any unreacted thiosulfate compound, trace amounts of undesired sulfate compounds and possibly some carbonate salts. In addition, it will in some cases contain minor amounts of the corresponding polysulfide compound. In accordance with the present invention at least a portion of this liquid stream is then admixed with the remaining portion of the effluent stream from the preliminary treatment step, and the resulting mixture is charged to the third step, the polysulfide forming step, of the present process. In one mode of operation of the present process, a portion of this liquid stream from the second step is charged to the first step in order to supply the necessary reducing agent for use therein. The remaining portion would then be passed to the third step as explained hereinbefore.

In the third step of the present invention the remaining portion of the effluent stream from the first step and at least a portion of the effluent stream from the second step are subjected to reduction conditions selected to result in the formation of the corresponding polysulfide compound. In order to effect the formation of sulfur in this step, it is necessary to react therein two moles of sulfide per mole of thiosulfate reactant. Since it is desired to form polysulfide in this step, it is a preferred practice of the present invention that this step is operated with a mole ratio of sulfide reactant to thiosulfate reactant which is substantially above this minimum stoichiometric amount. More preferably, it is preferred to select this mole ratio from the range corresponding to about 2:1 to about 20:1 moles of sulfide per mole of thiosulfate, with best results obtained at the relatively high mole ratios. In particular good results have been obtained at mole ratios of 2.4:1, 3.8:1 and 7.4:1, with higher conversion observed at the higher mole ratios. The source of the excess sulfide reactant for use in this step is preferably a substantial portion of the $H_2S$ product of the subsequently described polysulfide decomposition step. Accordingly, a preferred mode of operation of this step involves the building up of a substantial inventory of sulfide reactant by continuously circulating sulfide reactant around a flow circuit between the present step and the polysulfide decomposition step. As was explained hereinbefore, this inventory of sulfide reactant can be built up during start-up of the present process by charging substantially all of the effluent streams from the first step to the second step until the desired amount of sulfide reactant has accumulated in this sulfide flow circuit. Thereafter, a portion of the effluent stream from the first step is diverted to this polysulfide-forming step so that production of a polysulfide can begin.

The conditions utilized in this third step are reduction conditions which typically are relatively more severe than those utilized in the preliminary treatment step. These conditions can be generally characterized as a relatively higher temperature and longer contact time than those utilized in the preliminary treatment step. They generally comprise a temperature of about 100° to about 370° C., with best results obtained at a temperature of about 175° to about 250° C.; a pressure sufficient to maintain a liquid phase condition in this third step and generally a pressure selected from the range of about 100 to 5,000 psig. is adequate; and a contact time of about 0.05 to about 3 or more hours, with a preferred contact time of about 0.01 to about 2 hours. It is to be carefully noted that this polysulfide-forming step does not require a catalyst and is essentially a thermal reaction. Excellent results have been obtained in this step when the thiosulfate reactant is ammonium thiosulfate and the sulfide reactant is ammonium hydrosulfide at a sulfide to thiosulfate ratio of 7.5:1, a temperature of 200° C., a pressure of 650 psig., and a contact time of 0.1 hrs.

The effluent stream from this third step will contain the corresponding polysulfide compound, any unreacted sulfide reactant, any unreacted thiosulfate compound, trace amounts of undesired sulfate compounds and the alkaline reagent. It is a feature of the present invention that the amount of sulfate compounds formed in this third step will be less than 5, and typically less than 1 percent, of the total sulfur converted in this step.

In the final step of the present invention, the polysulfide decomposition step, the polysulfide containing effluent stream from this third step is subjected to any suitable decomposition procedure designed to decompose the polysulfide compound into its component parts which are a sulfide compound and elemental sulfur. One procedure for decomposing a polysulfide compound taught in the art in U. S. Pat. No. 1,783,725 involves heating the polysulfide solution in a closed container to a relatively high temperature with recovery of liquid sulfur from the bottom of the heating zone. Another acceptable procedure involves the addition of a relatively strong acid such as sulfuric acid, nitric acid, hydrochloric acid or the like in an amount sufficient to lower the pH of the stream to a point where the polysulfide will automatically decompose. Ordinarily, it is sufficient to lower the pH to a value less than 7. A preferred procedure for use in this step involves subjecting the polysulfide-containing stream to thermal decomposition conditions effective to produce an overhead stream typically containing hydrogen sulfide and water, and a bottom stream containing elemental sulfur. Suitable polysulfide decomposition conditions are a temperature of about 100° to 200° C. and a pressure of about 1 to about 75 psig. Excellent results have been obtained by taking 20 vol percent of the effluent stream overhead at a temperature of 140° C. and a pressure of 38 psig. Generally, this polysulfide decomposition reaction can be conducted in a distillation zone wherein $H_2S$ is stripped from the polysulfide solution with the aid of a suitable gas stream such as steam, carbon dioxide, nitrogen, air and the like, which can be injected into the bottom of the distillation zone. Carbon dioxide is particularly useful because it acts to decrease the pH of the solution. Moreover, upflowing vapors may be generated in this distillation zone by supplying heat to the bottom of same by means such as steam coil or a conventional reboiler. When the temperature utilized in the bottom of the distillation zone is less than the melting point of sulfur, the elemental sulfur, produced in this step will be present in the form of a slurry of solid particles in the aqueous bottom stream withdrawn therefrom. This sulfur slurry-containing aqueous stream can then be subjected to any of the techniques taught in the art for removing a solid from a liquid such as filtration, settling, centrifuging, etc., to remove the elemental sulfur therefrom and to form a treated water stream containing only a small amount of sulfur and sulfur compounds relative to the input sulfite-containing stream. In the case where the decomposition temperature utilized in this step is greater than the melting point of sulfur, the bottom stream from the distillation column will be a mixture of liquid sulfur in an aqueous stream. This mixture can then be passed to a settling zone wherein the liquid sulfur can be allowed to settle out and form a separate sulfur phase. In this last case the separation of the elemental sulfur from the treated water stream can be performed, if desired, within the distillation zone by allowing the liquid sulfur to collect at the bottom of this zone and separately drawing off a treated water stream as a side stream and a liquid sulfur stream as a bottom stream.

Having broadly characterized the essential step comprising the present method, reference is now made to the attached drawing for a detailed explanation of a working example of a preferred flow scheme for the present invention. The attached drawing is merely intended as a general representation of the flow scheme employed with no intent to give details about heaters, condensers, pumps, valves and the like equipment except where a knowledge of these devices is essential to an understanding of the present invention or would not be self-evident to one skilled in the water treating art.

Referring now to the attached drawing, an input water stream containing ammonium sulfide and bi-sulfide in an amount of about 10 wt. percent thereof is continuously introduced into the system via line 1 and passed to reaction zone 2. Also introduced into zone 2 is a reducing agent selected from the group consisting of ammonium hydrosulfide, $H_2S$, elemental sulfur, ammonium polysulfide and mixtures of these reducing agents. In the case where the reducing agent is elemental sulfur it is a portion of the sulfur product of subsequently described zone 19 which is charged to zone 2 via lines 21, 22 and 1 when valve 23 is in the open position and valves 26, 18, and 13 are in the closed position. Another source for the reducing agent for zone 2 is a portion of the ammonium polysulfide produced in subsequently described zone 15. When polysulfide is the reducing agent, it is charged to zone 2 via lines 16, 17 and 1 when valve 18 is in the open position and valves 13, 26, and 23 are in the closed position. Yet another source for the necessary reducing agent for zone 2 is a portion of the sulfide-containing effluent stream produced in zone 8. It is charged to zone 2 via lines 12 and 1 when valve 13 is in the open position and valves 18, 26 and 23 are in the closed position. The final internal source for the reducing agent utilized in zone 2 is a portion of the $H_2S$-containing overhead stream from zone 19. It is passed to zone 2 via line 14 when valve 26 is in the open position and valves 13, 18 and 23 are in the closed position. The preferred source for the necessary reducing agent is a portion of the $H_2S$-containing overhead stream produced in decomposition zone 19. Of course during start-up of the process, an exterior source for sulfide can be provided or it can be generated in zone 6 from the input water stream. Regardless of the source of the reducing agent, it will be charged to zone 2 in an amount sufficient to react with all the sulfite compound present in the input water stream to produce thiosulfate. For example, in the preferred case where the reducing agent is $H_2S$, it is typically charged to zone 2 in an amount above the stoichiometric amount of 0.5 moles of sulfide per mole of sulfite, with good results typically obtained at a mole ratio of 1:1. Ordinarily during start-up of the present system an external source for the necessary reducing agent will be necessary; however once the plant is started-up and lined-up, all of the necessary reducing agent will be obtained from internal sources as previously explained.

Zone 2 is a conventional thermal reaction zone designed in the preferred case to effect intimate contact between the input water stream and the $H_2S$-containing gas stream and in the other cases between the input water stream and the particular aqueous stream containing the reducing agent. In the case illustrated in the drawing, the zone is shown operating in a concurrent flow mode. In the preferred case, the temperature within zone 2 is maintained by conventional means at about 65° C. and the pressure is about 50° psig. The flow rate of the reactants is adjusted to result in a residence time of about three minutes. These conditions with the preferred $H_2S$-reducing agent result in the conversion of 95 percent of the ammonium sulfite and bisulfite contained in the input water stream to ammonium thiosulfate, with less than 2 percent converted to undesired ammonium sulfate.

An effluent stream containing ammonium thiosulfate and minor amounts of unreacted ammonium sulfite, bisulfite and of unreacted ammonium sulfide or hydrosulfide is withdrawn from zone 2 via line 3 and split into two portions at the junction of line 3 with lines 4 and 5. The first portion comprises about two-thirds of the effluent stream and is charged via line 4 to the first reduction zone, zone 6. The second portion is charged to zone 15 via line 5. Also introduced into zone 6 is a reducing gas stream which in the preferred case essentially comprises carbon monoxide. It enters zone 6 via lines 11, 9 and 4. After the process is started-up, the reducing gas stream entering zone 6 is composed of two portions, one portion being make-up reducing gas which enters the system via line 11, and the other portion being recycled unreacted reducing gas which is recovered in zone 8 and recycled via line 9. Zone 6 contains a fixed bed of a catalyst comprising 10 to 12 mesh particles of activated carbon having a cobalt sulfide component combined therewith in an amount sufficient to result in the catalyst containing 2 wt. percent of cobalt. The amount of carbon monoxide introduced into zone 6 is sufficient to provide a mole ratio of carbon monoxide to ammonium thiosulfate charged thereto of about 5.5:1. By conventional means zone 6 is operated at a temperature of 200° C., a pressure of 500 psig. and a liquid hourly space velocity of 1 hrs.$^{-1}$.

An effluent stream is then withdrawn from zone 6 via line 7 and passed to separating zone 8 wherein a gas phase is allowed to separate from a liquid phase. Zone 8 is operated at substantially the same temperature and pressure as zone 6. The gaseous phase separated therein is withdrawn therefrom via line 9. It contains unreacted carbon monoxide, carbon dioxide and minor amounts of $H_2O$ and $H_2S$. A portion of this gas stream is vented from the system via line 10 in order to prevent the build up of $CO_2$ in the flow circuit between zones 6 and 8, and the remaining portion is recycled to zone 6 via lines 9 and 4. The liquid phase formed in zone 8 contains ammonium hydrosulfide, ammonium carbonate, unreacted ammonium thiosulfate, ammonium hydroxide and minor amounts of ammonium polysulfide and undesired ammonium sulfate. An analysis of this liquid phase shows that 99 percent of the thiosulfate charged to zone 6 is converted therein at a selectivity for sulfide of about 95 percent and with less than 2 percent being converted to ammonium sulfate. It is withdrawn from zone 8 via line 12. In all cases, a substantial portion of this liquid phase is passed via lines 12, 14 and 5 to a second reduction zone 15. In accordance with one mode of operation of zone 2, a portion of this liquid effluent stream from zone 8 is passed via line 12 through valve 13 and line 1 into zone 2 wherein the sulfide component thereof constitutes the reducing agent for use in zone 2.

Turning now to zone 15, it is a conventional thermal reactor designed to effect intimate contact between the two liquid streams flowing thereto. As previously explained, it is preferred to operate zone 15 with a substantial excess of sulfide reactant and ordinarily this additional sulfide reactant is obtained from decomposition zone 19 via lines 24, 25 and 5. In effect the additional sulfide reactant circulates around a flow circuit between zone 15 and 19 which is formed by lines 16, 24, 25 and 5. In the particular case illustrated in the drawing, sufficient $H_2S$ is obtained from this second source to insure that the mole ratio of sulfide reactant to thiosulfate reactant within zone 15 is 7.5:1. Ordinarily during start-up of the process, the necessary excess sulfide reactant can be manufactured in zone 6 by charging essentially all of the thiosulfate reactant produced in zone 2 to zone 6 until sufficient sulfide accumulates in this sulfide circuit, thereafter a portion of thiosulfate reactant can be diverted to zone 15 via lines 3 and 5 and the normal operation of zone 15 commenced.

Zone 15 is maintained by conventional means at a temperature of about 200° C. and a pressure of about 650 psig. The flow rates of the input streams are, moreover, adjusted so that the residence time of the reactants charged thereto is approximately 6 minutes.

An effluent stream is then withdrawn from zone 15 via line 16 and is found to contain ammonium polysulfide, unreacted ammonium thiosulfate, unreacted ammonium sulfide, ammonium carbonate, ammonium bicarbonate, ammonium hydroxide, and ammonium sulfate. An analysis of this stream indicates that 99 percent of the thiosulfate charged to zone 15 is converted to ammonium polysulfide therein. Likewise, it indicates that less than 0.5 percent of the total sulfur-containing reactants charged to zone 15 are converted therein to the undesired ammonium sulfate. At the junction of line 16 with line 17, the effluent stream for zone 15 can be divided into two portions depending upon whether or not valve 18 is in the open position. When valve 18 is open, a portion of this polysulfide-containing stream is passed to zone 2 via lines 17 and 1 in order to furnish at least a portion of the necessary reducing agent therefor. Ordinarily, in this last mode of operation, the portion passed to zone 2 is approximately 10 to about 25 percent of the effluent stream from zone 15. In the case where valve 18 is in the closed position the entire amount of the effluent stream from zone 15 is charged via line 16 to decomposition zone 19.

In zone 19, the ammonium polysulfide-containing water stream is decomposed to yield $H_2S$, elemental sulfur and a treated water stream containing ammonium carbonate, ammonium bicarbonate, ammonium hydroxide and minor amounts of undesired ammonium sulfate. Preferably, zone 19 is a distillation zone which is maintained at conditions including a temperature in the range of about 100° to about 200° C. and a pressure of about 0.1 to 10 atmospheres effective to form an overhead gas stream containing $H_2S$, $H_2O$, and minor amounts of $NH_3$ which is withdrawn therefrom via lines 24, and an aqueous side stream, which is the product treated water stream and is withdrawn from the system via line 20. In order to prevent carry-over of $NH_3$, it is a preferred practice to inject a portion of this side stream into the top of the distillation column in order to maintain same at low temperatures and to scrub $NH_3$ out of the overhead stream. In most cases, it is advantageous to accelerate the polysulfide reaction in the bottom of zone 19 by conventional means such as a steam coil or conventional reboiler.

The overhead stream from zone 19 is withdrawn therefrom via line 24, and at least a major portion of it is recycled to zone 15 via lines 24, 25 and 5. As previously explained, in one mode of operation of zone 2, a portion of this overhead stream from zone 19 is passed via lines 24 and 1 back to zone 2 when valve 26 is in the open position. It is to be noted that this overhead stream can be, if desired, cooled by conventional means to form an aqueous solution containing ammonium hydrosulfide and ammonium hydroxide which then can be charged to zone 15 and 2 in the manner previously indicated.

When the temperature utilized in the bottom of zone 19 is less than the melting point of sulfur, the sulfur product of the polysulfide decomposition reaction will be present in the form of a slurry of solid particles in an aqueous stream withdrawn from the bottom of zone 19. This sulfur-containing bottom stream can then be subjected to any of the techniques taught in the art for recovering a solid from a liquid such as filtration, settling, centrifuging and the like in order to recover the elemental sulfur. In the case illustrated in the drawing, decomposition zone 19 is operated at a bottoms temperature greater than the melting point of sulfur so that liquid sulfur forms in the bottom of the zone. In particular, excellent results are obtained when zone 19 is operated at a bottoms temperature of 140° C., a pressure of 38 psig. and with 20 to 30 percent of the liquid feed thereto being taken overhead. In this case, the liquid sulfur formed therein will collect at the bottom of zone 19 and be withdrawn therefrom via line 21. In one mode of operation of zone 2, a portion of this sulfur product from zone 19 will be passed to zone 2 via lines 21, 22 and 2, when valve 23 is in the open position.

The treated water stream withdrawn from zone 19 via line 20 will contain only a minor amount of sulfide; for example at the particular conditions specified above for zone 19, this side stream will contain only about 800 ppm. of sulfide. An overall weight balance on the total system indicated that greater than 90 percent of the ammonium sulfite and bisulfite charged to this system via line 1 is converted therein to elemental sulfur, with substantially less than 5 percent converted to undesired ammonium sulfate.

It is intended to cover by the following claims all changes and modifications of the above disclosure of the present invention which would be self evident to a man of ordinary skill in the water-treating art.

I claim as my invention:

1. A process for treating an input water stream containing a water-soluble sulfite compound in order to produce elemental sulfur while minimizing the formation of sulfate by-products, said process comprising the steps of:
   a. contacting the input water stream with a reducing agent, selected from the group consisting of finely divided sulfur, a polysulfide compound, a water soluble sulfide compound and mixtures thereof, at reaction conditions selected to form a thiosulfate-containing effluent stream;
   b. reacting a first portion of the effluent stream from step (a) with a reducing agent, selected from the group consisting of carbon monoxide, hydrogen and mixtures thereof, at reduction conditions selected to produce a sulfide-containing effluent stream;
   c. reacting a second portion of the effluent stream from step (a) with at least a portion of the effluent stream from step (b) at reduction conditions selected to result in an effluent stream containing a polysulfide compound; and
   d. subjecting at least a portion of the effluent stream from step (c) to polysulfide decomposition conditions effective to form elemental sulfur, hydrogen sulfide and a substantially sulfate-free treated water stream.

2. A process as defined in claim 1 wherein the sulfite compound contained in the input water stream is ammonium sulfite or ammonium bisulfite.

3. A process as defined in claim 1 wherein the sulfite compound contained in the input water stream is an alkali metal sulfite or an alkali metal bisulfite.

4. A process as defined in claim 3 wherein said alkali metal sulfite is sodium sulfite or sodium bisulfite.

5. A process as defined in claim 1 wherein the sulfite compound contained in the input water stream is an alkaline earth metal sulfite or bisulfite.

6. A process as defined in claim 1 wherein the reaction conditions utilized in step (a) include a temperature of about 20° to about 150° C. and a pressure sufficient to maintain the input water stream in the liquid phase.

7. A process as defined in claim 1 wherein the reaction conditions utilized in step (b) include a temperature of about 125° C. to about 350° C. and a pressure sufficient to maintain a liquid phase during step (b).

8. A process as defined in claim 1 wherein the reduction conditions utilized in step (c) include a temperature of about 100° to 370° C. and a pressure sufficient to maintain a liquid phase during step (c).

9. A process as defined in claim 1 wherein the amount of reducing agent charged to step (b) is sufficient to provide a mole ratio of reducing agent to thiosulfate of about 4:1 to about 20:1.

10. A process as defined in claim 1 wherein the portion of the thiosulfate-containing effluent stream from step (a) that is charged to step (b) is about one-half to about three-fourths of the total effluent stream from step (a).

11. A process as defined in claim 1 wherein the reducing agent utilized in step (a) is at least a portion of the hydrogen sulfide produced in step (d).

12. A process as defined in claim 1 wherein the reducing agent utilized in step (a) is a portion of the elemental sulfur formed in step (d).

13. A process as defined in claim 1 wherein the reducing agent utilized in step (a) is a portion of the effluent stream containing a polysulfide compound which is produced in step (c).

14. A process as defined in claim 1 wherein the reducing agent utilized in step (a) is a portion of the effluent stream produced in step (b).

15. A process as defined in claim 1 wherein the input water stream contains about 0.1 to about 30 wt. percent of the water-soluble sulfite compound.

16. A process as defined in claim 1 wherein step (b) is performed in the presence of a solid catalyst comprising activated carbon.

17. A process as defined in claim 1 wherein step (b) is performed in the presence of a catalyst comprising a combination of a metallic component, selected from the group consisting of the transition metals of groups VI and VIII of the Periodic Table and compounds thereof, with a porous carrier material.

18. A process as defined in claim 17 wherein the catalyst utilized in step (b) is cobalt sulfide combined with activated carbon.

19. A process for treating an input water stream containing ammonium sulfite or ammonium bisulfite in order to produce elemental sulfur while minimizing the formation of ammonium sulfate, said process comprising the steps of;
   a. contacting the input water stream with a reducing agent, selected from the group consisting of finely divided elemental sulfur, hydrogen sulfide, ammonium hydrosulfide, ammonium polysulfide and mixtures thereof, at reaction conditions selected to form an effluent stream containing ammonium thiosulfate;

b. reacting a first portion of the effluent stream from step (a) with a reducing agent, selected from the group consisting of carbon monoxide, hydrogen and mixtures thereof, at reduction conditions selected to result in an effluent stream containing ammonium hydrosulfide;

c. reacting a second portion of the effluent stream from step (a) with at least a portion of the effluent stream from step (b) at reduction conditions selected to result in an effluent stream containing ammonium polysulfide; and d. subjecting at least a portion of the effluent stream from step (c) to polysulfide decomposition conditions effective to form elemental sulfur, hydrogen sulfide and a treated substantially sulfate-free water stream.

20. A process as defined in claim 19 wherein step (b) is performed in the presence of a catalyst comprising a combination of a metallic component, selected from the group consisting of the transition metals of groups VI and VIII of the Periodic Table and compounds thereof, with a porous carrier material.

* * * * *